United States Patent [19]

Wurzenberger

[11] Patent Number: 4,823,389
[45] Date of Patent: Apr. 18, 1989

[54] METHOD AND CIRCUIT APPARATUS FOR CHECKING THE AUTHORIZATION OF ACCESS TO A SIGNAL PROCESSING SYSTEM

[75] Inventor: Johann F. Wurzenberger, Munich, Fed. Rep. of Germany

[73] Assignee: Siemens Aktiengesellschaft, Berlin and Munich, Fed. Rep. of Germany

[21] Appl. No.: 863,218

[22] Filed: May 14, 1986

[30] Foreign Application Priority Data

May 28, 1985 [DE] Fed. Rep. of Germany ....... 3519049
Mar. 11, 1986 [DE] Fed. Rep. of Germany ....... 3608028

[51] Int. Cl.$^4$ ............................................... H04L 9/00
[52] U.S. Cl. ........................................ 380/23; 380/25
[58] Field of Search ................................ 375/2.1, 106; 178/22.08, 22.09; 380/23–25, 21; 340/825.34

[56] References Cited

U.S. PATENT DOCUMENTS

| | | | |
|---|---|---|---|
| 4,182,933 | 1/1980 | Rosenblum | 375/2.1 |
| 4,193,131 | 3/1980 | Lennon et al. | 380/25 |
| 4,288,659 | 9/1981 | Atalla | 178/22.09 |
| 4,366,573 | 12/1982 | Ranch | 375/106 |
| 4,578,531 | 3/1986 | Everhart et al. | 380/21 |
| 4,612,413 | 9/1986 | Robert et al. | 380/23 |
| 4,626,845 | 12/1986 | Ley | 380/23 |
| 4,665,396 | 5/1987 | Dieleman | 380/23 |
| 4,691,355 | 9/1987 | Wirstrom et al. | 380/23 |
| 4,733,345 | 3/1988 | Anderson | 380/25 |

Primary Examiner—Salvatore Cangialosi
Attorney, Agent, or Firm—Adel A. Ahmed

[57] ABSTRACT

For checking authorization of access to a signal processing system (SVS) from designated peripheral units (TE, BS) connected with the system, for the purpose of transmitting and, if the occasion arises, receiving signals, it is provided that a keyword is entered in the signal processing system for each peripheral unit. Such a keyword is always derived from a code number allocated to a respective peripheral unit and from identification data which is freely selectable for the respective peripheral unit. In the event of an intended access by a peripheral unit, the code number transmitted by said peripheral unit and the identification data pertaining thereto are combined with the keyword allocated to the respective peripheral unit.

9 Claims, 4 Drawing Sheets

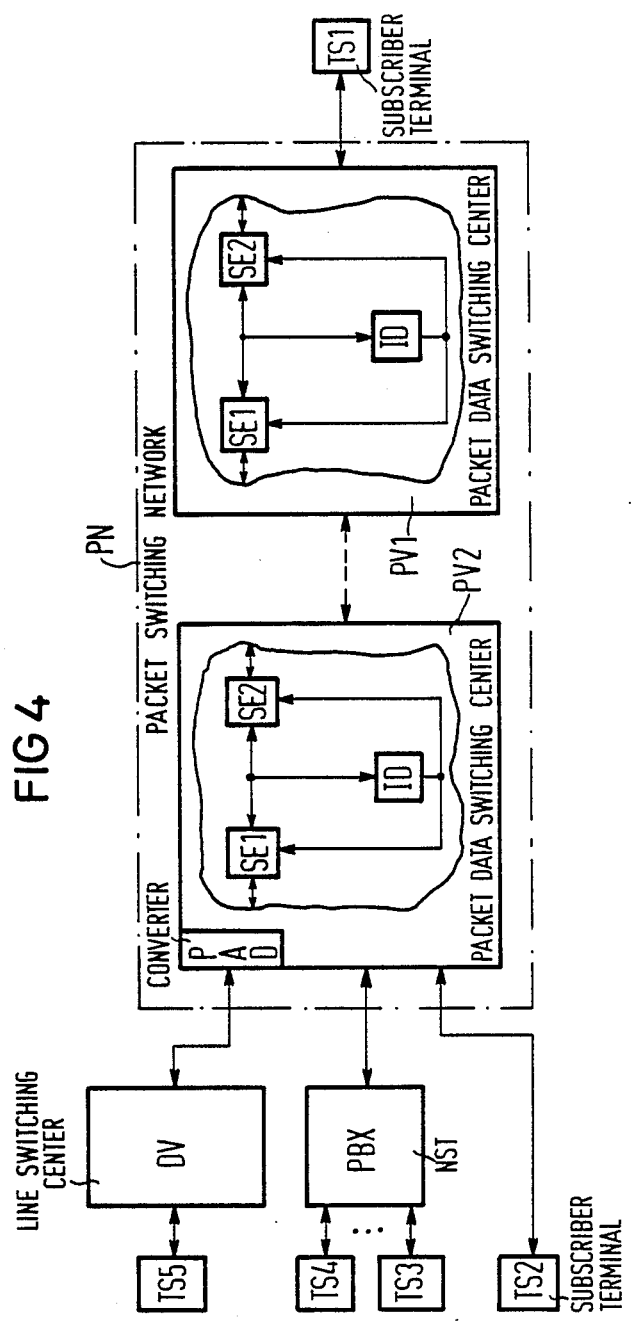

METHOD AND CIRCUIT APPARATUS FOR CHECKING THE AUTHORIZATION OF ACCESS TO A SIGNAL PROCESSING SYSTEM

BACKGROUND OF THE INVENTION

1. Technical Field

The invention relates to the field of signal processing generally and, more particularly, to a method and circuit apparatus for checking the authorization of access to a signal processing system from designated peripheral units.

2. Description of the Prior Art

Peripheral units are connected to a signal processing system for the purpose of transmitting and, if the occasion arises, receiving signals by means of a code number allocated to each peripheral unit and by means of identification data freely selectable for the respective peripheral units. Signal processing systems which can be accessed from peripheral units are frequently provided with units which, in the event of an intended access from a peripheral unit connected to such a signal processing system, first of all check the access authorization of the relevant peripheral unit. Such a signal processing system can, for example, be found in private and public communications systems as well as in data processing systems which offer specific services to external subscribers. The examination of access authorization, similar to the subscriber identification in a videotex system known from German No. OS 28 42 777, can be performed, e.g., in such a way that a specific code number, for example, a specific calling number, is allocated to each of the peripheral units. In the event of an intended access, the specific number is transmitted from a peripheral unit to the signal processing system, together with freely selectable identifcation data for the particular peripheral unit. An examination of the access authorization by means of said code number and the associated identification data, however, has the disadvantage that forgeries—in particular, through repeated manipulation—of code numbers and the associated identification data cannot be precluded.

SUMMARY OF THE INVENTION

It is the object of the present invention to disclose a method whereby more secure checking of the access authorization from peripheral units is feasible, to a large extent, by means of a novel method and circuit apparatus of the abovementioned type.

According to the present invention, the security problems of prior art signal processing systems are solved by allocating to the peripheral units of the signal processing system a keyword which is always derived from the known code number and identification data of the respective peripheral unit, and that, in the event of an intended access from one of the peripheral units, first of all, the code number transmitted for access purposes by the peripheral unit, as well as the associated identification data, are combined with the keyword allocated to the particular peripheral unit.

The present invention offers the advantage that, by combining several data, namely the code number, the identification data and the keyword, the access authorization can be checked with a high degree of security. This degree of security is achieved, in particular, by the fact that two types of data to be combined are not simultaneously accessible to users or the operating personnel of the signal processing system. The signal processing system is thus provided only with the keywords allocated to the individual peripheral units. Furthermore, the procedure for defining said keywords are not known either to the users or to the operating personnel of the signal processing system. Finally, the identification data are defined in a freely selectable way by the users of the signal processing system upon placing a peripheral unit into operation, and they are not entered in the associated signal processing system.

The method according to the present invention may also prove advantageous for checking the access authorization from a control station of the signal processing system to data stored in said signal processing system. Prior to obtaining access to such data, the access authorization may be checked by means of a code number allocated to one of the relevant control stations, the freely selectable identification data for the relevant control station, and a keyword entered in the signal processing system for the relevant control station.

Moreover, the method according to the invention also proves advantageous for checking the authorization to activate the control sequences relevant to the operation of a signal processing system from a control station of said signal processing system. Prior to an activation of control sequences, the access authorization concerning the relevant control station may be checked by means of a code number allocated to the relevant control station, the freely selectable identification data for the relevant control station, and a keyword entered in the signal processing system for the relevant control station.

The advantage offered by the two abovementioned applications is that only authorized operating personnel have access to the data stored in the signal processing system or are entitled to activate specific control sequences concerning the operation of the signal processing system.

In addition to the abovementioned code number and identification data, a defined system code number can be integrated into the derivation of the keywords and the checking process of access authorization. This offers the advantage of further increasing security in checking the access authorization to a signal processing system.

In addition, the method according to the present application offers the advantage of identifying calling and/or called subscriber terminals of a packet data switching center integrated in the connections which run through a packet data switching center of a packet switching network. With this method, such an identification is performed in such a way that, when placing into operation the respective communications channel, a keyword is entered in the packet data switching center for each subscriber terminal communicating with the packet data switching center via a communications channel, which in the packet data switching center is derived from the specified freely selectable identification data and the calling number allocated to the respective subscriber terminal. In the course of establishing a connection, the calling number allocated to the respective subscriber terminal is transmitted in addition to the respective identification data in a data packet initiating said establishment, and the transmitted calling number and the associated identification data are always combined with the keyword allocated to the respective subscriber terminal for identification.

Preferably, an initiated connection is continued only in the event of a correct identification of each of the respective calling and/or called subscriber terminals. This offers the advantage that, in the first place, switching operations in a packet data switching center can be handled only when the respective calling and/or calling subscriber terminal can be determined for subsequent collection of subscriber charges. In the second place, it is possible to block the setting up of connections for specific subscriber terminals, for example, by cancelling keywords. The setting up of a separate list of blocked subscriber terminals in the respective packet switching center thus becomes superfluous. For practical purposes, with subscriber terminals connected with the packet data switching center through a private branch exchange (PBX), separate identification data can be selected for said subscriber terminals by an operator of the PBX. This provides a simple method of call record logging for the individual subscriber terminals of the PBX.

If various optional services provided by operators of switching networks are used by the individual subscriber terminals, it is practical, with one data packet to initiate the establishment of a connection, and to transmit data signals requesting services which data, after an identification of the respective subscriber terminal, can be accepted as actual parameters. This offers the advantage that the services provided by switching network operators can, as a matter of fact, be used only by authorized subscribers.

Circuit apparatus for performing the method in accordance with the present invention can be realized with relatively low expenditure in circuitry due to the fact that the signal processing system has a memory configuration with a number of storage cells corresponding to the number of peripheral units, which storage cells are used for storing the keywords allocated respectively to the peripheral units. A first register is provided for buffering a code number transmitted by one of the peripheral units, and a second register is provided for buffering the identification data pertaining to its respective code number. Also, a combinatorial circuit is connected with said registers and the memory configuration, which combines both the code numbers fed by said registers to said combinatorial circuit and the identification data pertaining to said code numbers with the keywords corresponding to the respective code numbers.

In the following description, the present invention is explained in detail by way of examples and in the drawings.

BRIEF DESCRIPTION OF THE DRAWINGS

FIG. 4 shows a block diagram of a packet switching network as a further application of the present invention.

DETAILED DESCRIPTION

Figure 1:
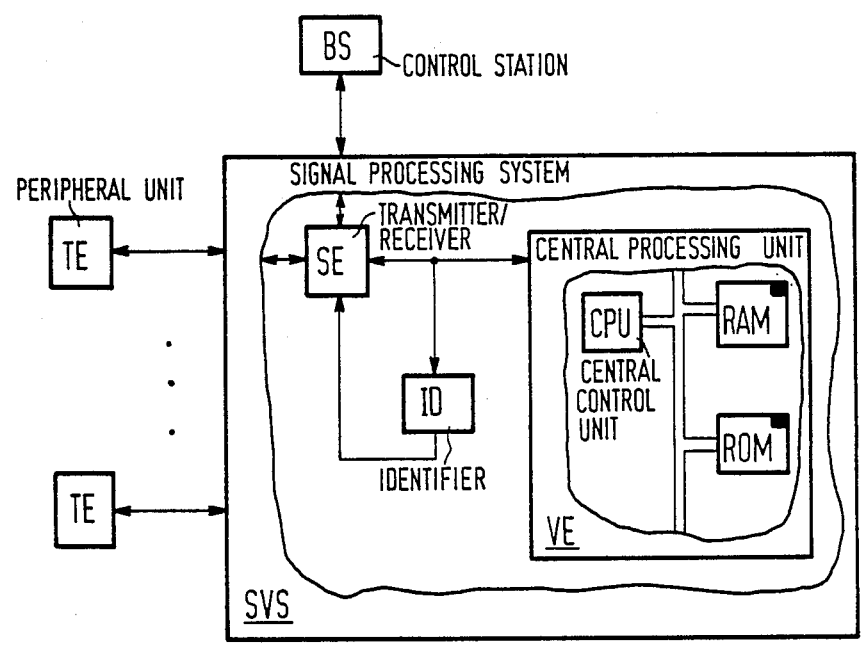
FIG. 1 shows a block diagram of a signal processing system in accordance with the invention.

FIG. 1 shows a section of a signal processing system SVS. This system can, for example, be a communications system of either a private or public communications network. However, said system can also form a data processing system which external users may access for specific services in the field of data processing. The signal processing system is interfaced with a number of peripheral units TE. Depending on the type of associated signal processing system, said peripheral units may be developed from conventional data terminals for the purpose of receiving and/or transmitting data signals. Moreover, the siginal processing systems SVS is connected with a control station, designated as BS, which serves as an addition peripheral unit through which the operating personnel can gain access to the signal processing unit for the purpose of maintenance and servicing.

FIG. 1 shows a central processing unit VE of the signal processing system SVS. Further, the central processing unit VE merely indicates the existence of a central control unit CPU as well as a memory unit connected with said control unit through a bus system, comprising read-only memories ROM and read-write memories RAM. Said central processing unit VE is connected with a transmitterreceiver configuration SE through which said peripheral units TE and the control station gain access to the processing unit. Finally, the central processing unit and the transmitter-receiver configuration are also connected with the input of an identifier configuration ID. The output of said identifier configuration is interfaced with a control input of the transmitter-receiver configuration.

Figure 2:
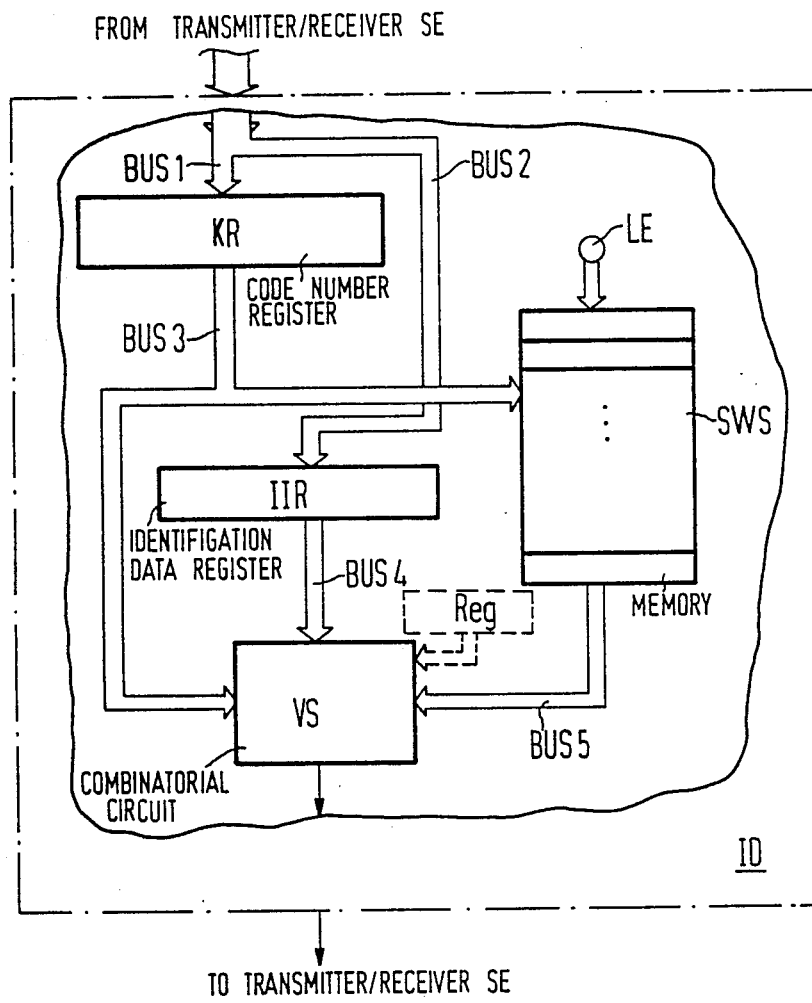
FIG. 2 shows the design of a schematic identification configuration shown in FIG. 1.
Figure 3:
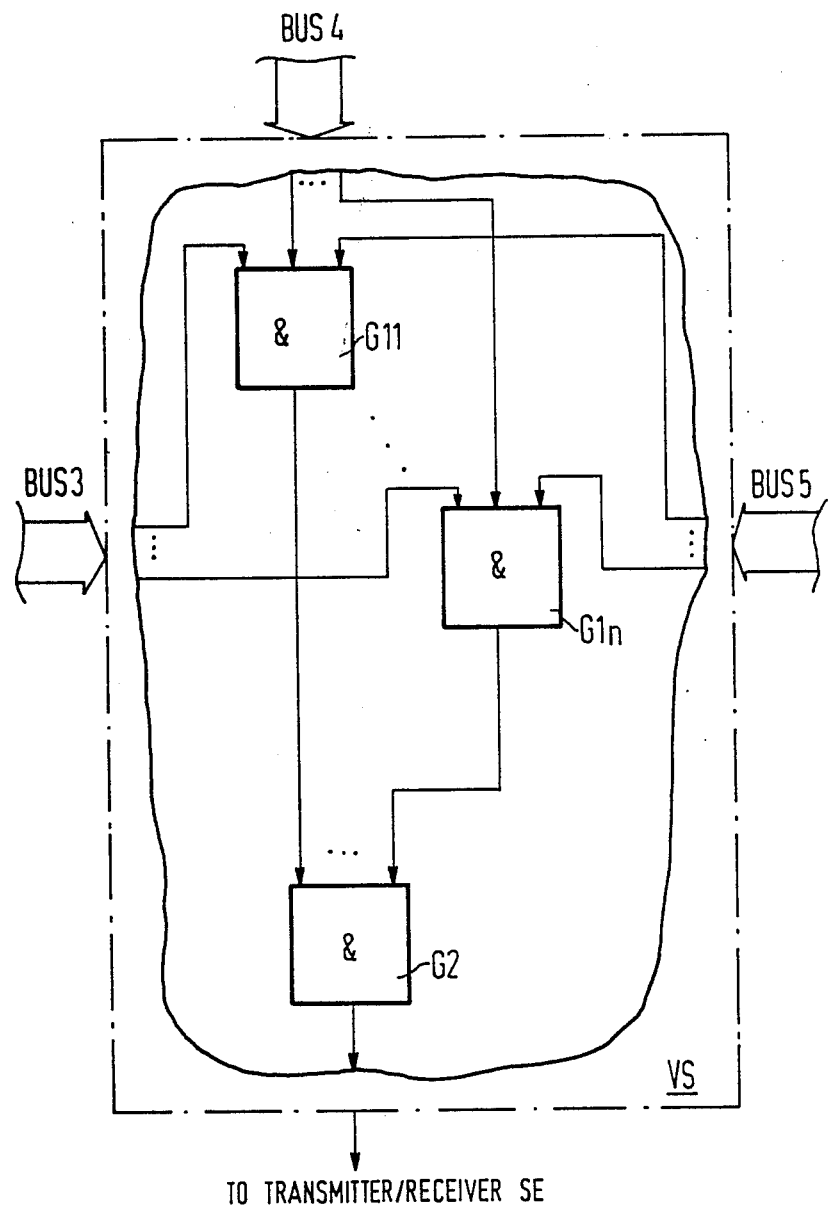
FIG. 3 shows a possible design for a combinatorial circuit provided in the identification configuration according to FIG. 2.

With reference to FIGS. 2 and 3, the following is a detailed description of the method of checking access authorization to the signal processing system SVS.

To each of the peripheral units TE and the control station BS is allocated a separate code number by the signal processing system, and to a transmission system, a calling number. In the start-up of the signal processing system, a keyword is formed for each peripheral unit and the control station after the mathematical operation has been defined, said keyword being formed by means of the respective allocated code number and the identification data, which are freely selectable by the user of the respective peripheral unit or by the control station and represents a code sequence. Said keyword is stored in a memory SWS (FIG. 2) of the identifier configuration ID for the period during which the respective peripheral unit or control station is interfaced with the signal processing unit, or until a keyword has been redefined. Said memory is provided with a position input LE for receiving keywords and is so arranged that for each of the peripheral units TE and control station BS a storage cell is reserved for keyword input. The defined mathematical operation, whereby the individual keywords are determined, is not known either to users or operating personnel of the signal processing system. Furthermore, the identification data defined by users are not accessible to the operating personnel. Only authorized personnel at the operating console are familiar with the defined identification data.

If it is intended, for example, to access the signal processing system SVS from one of the peripheral units, that peripheral unit is requested to transmit the code number allocated to it, as well as its identification data. For the purpose of buffering said data, the identification configuration ID (FIG. 2) is provided with two separate registers, namely a code number register KR and an identification data register IIR, which receive the data fed from the transmitter-receiver configuration SE via a bus system BUS1 and BUS2, respectively.

By means of the code number buffered in the register KR, the abovementioned memory SWS is now selected via a bus system BUS3 for reading out the keyword which is stored in said memory for the peripheral unit designated by said code number. To said readout keyword, which arrives via a bus system BUS5, and the data stored in the registers KR and IIR which are provided, on the one hand, via bus system BUS3 and, on the other hand, via bus system BUS4, a combinatorial circuit VS (FIG. 2) is subsequently applied. Said combinatorial circuit subjects the input signals, which are fed to it in the form of input variables, to a predefined binary mathematical operation. Then the binary output signal occurring at the output of the combinatorial circuit provides details of the result of the check of the access authorization to the peripheral unit concerned. If, for example, the output signal corresponds to the defined expected value, the peripheral unit TE in question is authorized to gain access to the signal processing system SVS.

For these checking procedures, depending on the type of requested security, any binary arithmetic linkages can be designated as mathematical operations for determining keywords as well as for the checking of access authorization by means of the combinatorial circuit VS. It is merely required that the two designated arithmetic linkages must be so synchronized that, after the access authorization has been checked correctly, a preset expected value appears at the output of the combinatorial circuit. An example of a possible embodiment of the combinatorial circuit VS is shown in FIG. 3. The combinatorial circuit VS shown has a number of AND elements G11 through G1n corresponding to the number of information bits pertaining respectively to the input signals. Said AND elements are developed with three inputs through which they are connected with lines of the bus systems BUS3, BUS4 and BUS5, which feed the respective information bits. The output signals of the AND elements G11 through G1n are fed to another AND element G2 which has a number of inputs corresponding to the number of said AND elements G11 to G1n. The output of said AND element G2 forms the output of the combinatorial circuit VS.

The above-described intended access to a signal processing system SVS from one of its peripheral units TE is permitted only after correct checking of the access authorization, which is indicated to the transmitter-receiver pairs SE from the combinatorial circuits VS as shown in FIG. 2.

In the preceding discussion, the checking of access authorization was explained with examples relating to a peripheral unit TE. The procedural sequences corresponding to the method explained above apply also to access to the signal processing unit intended by a control station BS. Such an access may, for example, be necessary for maintenance and servicing. At the same time, the checking procedure of access authorization described above ensures that only selected personnel can access the data stored in the signal processing system or can activate specific control sequences required for operating the signal processing system. It must also be pointed out that, in order to gain increased security in checking access authority, a separate system code can be allocated additionally to each signal processing system, said codes being included respectively as additional input variables in the abovementioned synchronized mathematical operation pursuant to FIG. 3 for the purpose of forming keywords and checking the access authorization to be performed by means of the shown combinatorial circuit VS. For said purpose, the identification configuration ID can, for example, as indicated in FIG. 2, have an additional register (Reg) connected with the combinatorial circuit VS, in which the system code for the associated signal processing system is stored.

The process described above for checking access authorization can also be applied advantageously to identify called and/or calling subscriber terminals in a relevant packet data switching center. The terminals are associated with switched connections which run via packet data switching centers of a packet switching network. FIG. 4 shows a schematic drawing of such a packet data switching network, designated with the letters PN. Said packet switching network can, for example, be formed by the two packet data switching centers PV1 and PV2 which are interconnected through a transmission line. Such packet switching centers can generally be connected to a number of subscriber terminals. However, for the purpose of simplification, FIG. 4 shows only a limited number of connected subscriber lines. For example, only one subscriber terminal, designated TS1, is connected with the packet switching center PV1. This may be a packet-oriented subscriber terminal which enables transmission of data signals in accordance with CCITT recommendataion X.25.

Subscriber terminals TS2 through TS5 are connected with the packet data switching center P2. In particular, the subscriber terminal TS2 is shown directly connected with the packet data switching center, i.e., a subscriber terminal able to receive and transmit data signals in packet form. The subscriber terminals TS3 and TS4 are connected through PBX NST with the packet switching center PV2.* On the contrary, what is required of the signals is a signal conversion. Therefore, the packet switching center PV2 shows in FIG. 4 a signal converter designated PAD. When a signal is transmitted from the line switching center DV to the packet switching center PV2, said converter, for example, first converts the signals transmitted in a stop-start format into packets. And when a signal is transmitted in the opposite direction, a corresponding conversion of said packets into signals with a start-stop format will take place. Said conversion functions are also known as packet assembly disassembly functions.
* see page 11a Irrespective of the abovementioned types of connections used in individual cases for connecting subscriber terminals to a packet switching center, it is necessary for the purpose of subsequent call Said PBX can be so developed that data can be exchanged in the form of packets between PBX and the associated packet switching center. And finally, the packet switching center PV2 is indirectly connected with a circuit switching center DV of a circuit switching network. The circuit switching network can, for example, be a telephon network. As such telephon networks do not transmit connection setup signals or data signals in the form of packets, said signal cannot be transmitted between the circuit switching center DV and the packet switching center PV2. record logging, for example, or the utilization of services provided by the operator of the packet data switching center—for instance, the allocation of a closed user group class of service—clearly to identify the subscriber terminals in the packet switching center which initiate the connection setup. In order to perform such an identification, the two packet switching centers PV1 and PV2 shown in FIG. 4 are provided respectively with the identification configuration ID described above. Said identification configuration is connected at the input side with the transmitter-receiver pair SE1 and SE2 through which each packet switching center receives or transmits data signals in the form of packets. At the output side, each identification configuration is connected with the respectively associated transmitter-receiver pair.

When placing into operation a communications channel of a packet switching center—for example, packet switching center PV2 shown in FIG. 4—for the purpose of connecting a packet-oriented subscriber terminal or a subscriber terminal through a converter, a keyword is formed in the manner described above by means of the calling number defined for the relevant subscriber terminal and by means of the identification data which is freely selectable by the user of the subscriber terminal. For the period during which the communications channel which has just been placed in operation is in service, or until a keyword has been redefined, such a keyword is then stored in a memory of the identification configuration ID pertaining to the relevant packet switching center, said memory being in conformity with the memory SWS shown in FIG. 2.

If, for example, a connection is to be set up from a packet-oriented subscriber terminal—for example, the subscriber terminal TS2 in FIG. 4—with another subscriber terminal—which may be the subscriber terminal TS1 shown in FIG. 4.—a packet (for an incoming call) must first be transmitted from the calling subscriber terminal TS2 so as to initiate the connection setup. Said packet contains, among other things, the calling number of the subscriber terminal TS2 and the selected identification data. By means of the identification configuration ID shown in FIG. 2 and 4, said calling number and the identification data are then employed for the identification of the subscriber terminal TS2 in the same manner described above for the checking procedure for access authorization to a signal processing system.

Only in the event of a correct identification by the combinatorial circuit shown in FIG. 2, which in this case is indicated to the transmitter-receiver pair SE1, will the connection setup initiated by the subscriber terminal TS2 be continued. This, for example, will ensure that a connection will only be made if the calling subscriber terminal is identifiable for call record logging.

On the other hand, the fact that a connection is fully set up only in the event of a correct identification of the calling subscriber terminal is also used for targeted blocking of outgoing calls from subscriber terminals. Then it is possible by the targeted cancelling of keywords to result in a lockout for the subscriber terminals allocated to said keywords. Separate lists of subscriber terminals blocked for outgoing calls are, therefore, not necessary.

In the process of continuing the connection setup, packets must be exchanged in compliance with CCITT recommendation X.25 between the relevant subscriber terminals, in this case the subscriber terminal TS2 and the packet switching center. However, this known exchange will not be described in detail.

In the preceding, the identification of a calling subscriber terminal was explained only in the example of the packet-oriented subscriber terminal TS2. The operational sequences corresponding to the above described sequences are also performed when the subscriber terminals to be identified are connected, for example, through a converter (PAD in FIG. 4) of the packet data switching center. In such a case, a so-called two-stage selection will occur. In the first stage, an access number for the packet switching network is transmitted, and, in the subsequent second stage, a selection procedure for the packet switching network will occur. For example, in said procedure, the calling number, the selected identification data, and the calling number of the called subscriber terminal are transmitted as selection data in the form of start-stop signals from a subscriber termminal, using an asynchronous transmission method, and are then entered in a corresponding packet by the converter PAD.

Finally, it was also indicated above that subscriber terminals can be connected via a PBX (NST in FIG. 4) with a packet switching center. In this case also the calling subscriber terminal is identified in the manner described above. Each of the subscriber terminals connected with the PBX's can be provided with separate identification data, so that, for example, call record logging can be performed for the individual subscriber terminals.

In addition, apart from the calling number of the calling subscriber terminal and the identification data, information signals requesting specific services can also be transmitted with a packet for the purpose of initiating a connection setup. In such a case, it is advantageous for said information signals to be accepted as actual parameters by the packet data switching center only when the calling subscriber terminal transmitting the packet has been correctly identified. This ensures, for example, that only authorized users are entitled to use specific services.

The above describes only the process for identifying subscriber stations, using a calling subscriber terminal as an example. However, in certain cases it may also be necessary to obtain the identification of called subscriber terminals, for example, when charges are assumed by the called subscriber or when called subscribers are allocated to closed user group classes of service. The process described above is also advantageous for this type of identification. The information required for such an identification, namely the calling number and the identification data, will in this case be transmitted from the respective called subscriber terminal, together with the call confirmation as a reply to an outgoing call, to the applicable packet data switching center.

As for the rest, the packet switching centers PV1 and PV2 shown in FIG. 4 can also be connected with control stations corresponding to the control station BS shown in FIG. 1, through which selected personnel are able to access the data stored in the respective packet data switching center or to activate the control sequences required for operating the respective packet data switching center.

Thus, there has been described a method and apparatus for checking authorization to access a signal processing system which should only be considered to be limited by the scope of the claims which follow.

What is claimed is:

1. A method for checking authorization to access a signal processing system from a designated peripheral unit connected to said system for the purpose of at least one of transmitting and receiving signals by means of a code number allocated to the respective peripheral unit and by means of identification data freely selectable for the respective peripheral unit, characterized in that, for each peripheral unit (TE, BS) a keyword is provided in the signal processing system, the keyword being always derived from the specified code number and the identification data of the respective peripheral unit and being unknown to a user of the respective peripheral unit such that, for access from a peripheral unit, first of all, the code number and the identification data are transmitted for said purpose by said peripheral unit and mathematically combined with the keyword allocated to the respective peripheral unit.

2. The method of authorizing access as recited in claim 1 of a peripheral unit, in particular, a control station of a signal processing system to data stored in said signal processing system, characterized in that, prior to obtaining access to such data, the access authorization is checked by means of a code number, allocated to a respective control station (BS), by means of the identification data freely selectable for the respective control station, and by means of a keyword entered in the signal processing system (SVS) for the respective control station.

3. The method of authorizing access as recited in claim 1 for activating control sequences concerning operation of a signal processing system from a control station of the signal processing system, characterized in that, prior to an activation of the control sequences, access authorization concerning the respective control station (BS) is checked by means of a code number allocated to the control station, by means of the freely selectable identification data for the respective control station, and by means of a keyword entered in the signal processing system (SVS) for the respective control station.

4. A method as recited in claim 1, further characterized in that, in addition to the code number allocated to the respective peripheral unit and identification data, a system code number designated for the signal processing system (SVS) can be integrated in the derivation of the keyword and the checking method of the access authorization.

5. A method as recited in claim 1 for identifying calling and/or called subscriber terminals (TS1 through TS4) of a respective packet data switching center integrated in the switched connections which run through packet data switching centers (e.g., PV2) of a packet switching network, characterized in that, in placing into operation a switched through communications channel, a keyword is entered in the packet data switching center for each subscriber terminal communicating with the packet data switching center via a communications channel, the keyword in the packet data switching center being derived from the specified freely selectable identification data and the calling number allocated to the respective subscriber terminal such that, in the course of setting up a connection, the calling number allocated to the respective subscriber terminal is transmitted along with the respective identification data in a packet initiating said setup; and the transmitted calling number and associated identification data are always combined with the keyword allocated to the respective subscriber terminal for the purpose of subscriber terminal identification.

6. The method as recited in claim 5, further characterized in that the process of establishing a connection only proceeds in the event of a correct identification of the respective calling and/or called subscriber terminal.

7. The method as recited in claim 5, further characterized in that, with subscriber terminals which are connected via a PBX (NST) with the packet data switching center (PV2), the operator of said PBX selects separate identification data for each of said subscriber terminals.

8. The method as defined in claim 5 further characterized in that a packet for initiating the establishment of a connection also transmits information signals requesting specific services, which, after an identification of the respective subscriber terminal, are accepted as parameters for the specific services.

9. Circuit apparatus for implementing a method of authorizing access to a signal processing system characterized in that the signal processing system (SVS) has a memory configuration (SWS) with a number of storage cells corresponding to a number of peripheral units seeking access to the signal processing system, the memory configuration for the purpose of storing keywords allocated to the peripheral units (TE, BS) seeking access such that a first register (KR) is provided for buffering a code number transmitted by one of the peripheral units, and a second register (IIR) is provided for buffering the identification data pertaining to the respective code number, a combinatorial circuit (VS) being linked to said registers (KR, IIR) and the memory configuration (SWS), the combinatorial circuit for combining the code numbers transmitted by the two registers and the identification data pertaining thereto with the keywords corresponding to the respective code numbers.

* * * * *